United States Patent [19]

Bouju et al.

[11] Patent Number: 4,477,301
[45] Date of Patent: Oct. 16, 1984

[54] PROCESS FOR HOLDING TOGETHER THE WIRES OF A PACKAGE BEAD RING FOR TIRES

[75] Inventors: Maurice Bouju; Jean-Louis Charvet, both of Clermont-Ferrand, France

[73] Assignee: Compagnie Generale des Etablissements Michelin, Clermont-Ferrand, France

[21] Appl. No.: 493,691

[22] Filed: May 11, 1983

[30] Foreign Application Priority Data

May 17, 1982 [FR] France ............................ 82 08751

[51] Int. Cl.³ ............... B29H 17/32; B65H 55/00; B65H 81/00; B60C 15/04
[52] U.S. Cl. ............................... 156/136; 156/175; 156/180; 156/291; 156/302; 156/296; 156/422; 156/460; 245/1.5; 140/102; 29/469.5; 242/173; 152/362 R
[58] Field of Search ............... 156/422, 460, 136, 169, 156/175, 184, 180, 290, 291, 302, 313, 296, 303; 245/1.5; 140/102; 29/469.5; 242/172, 173; 152/362 R

[56] References Cited

U.S. PATENT DOCUMENTS

| | | | |
|---|---|---|---|
| 1,635,187 | 7/1927 | Lough et al. | 156/460 |
| 2,014,359 | 9/1935 | Morrison | 156/422 |
| 3,033,731 | 5/1962 | Cole | 156/175 |
| 3,372,894 | 3/1968 | Pearce | 245/1.5 |
| 3,391,041 | 7/1968 | Moore | 156/174 |
| 4,305,769 | 12/1981 | Asquier et al. | 156/422 |

Primary Examiner—Lois E. Boland
Attorney, Agent, or Firm—Brumbaugh, Graves, Donohue & Raymond

[57] ABSTRACT

During the winding of the layers of the wires of a tire bead ring, a piece of ribbon is interposed at least twice per revolution between two consecutive layers of wires, the ribbon being formed of a thin flexible support bearing on each of its faces a layer of a material which adheres both to the support and to the wires.

4 Claims, 3 Drawing Figures

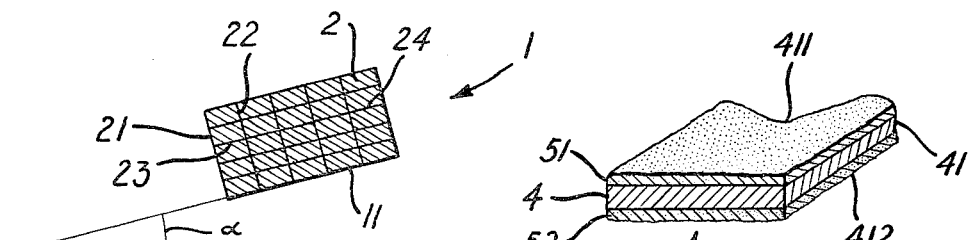
FIG. 1
FIG. 3
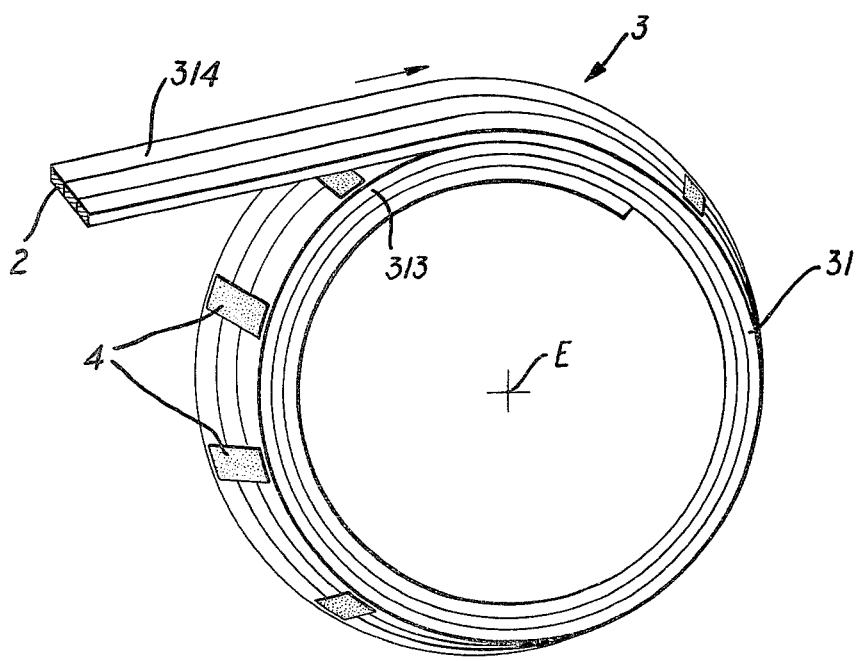
FIG. 2

PROCESS FOR HOLDING TOGETHER THE WIRES OF A PACKAGE BEAD RING FOR TIRES

BACKGROUND OF THE INVENTION

The present invention relates to bead rings of package type reinforcing the beads of tires and produced by winding wires, preferably metallic wires of rectangular cross-section, over a body of revolution.

The present invention applies in particular to bead rings of the type mentioned above whose radially inner face is frustoconical and smooth, and which are manufactured by the process described in French Patent No. 2,456,610 (which corresponds to U.S. Pat. No. 4,305,769). This process consists essentially in imparting a permanent deformation to the steel wire by means of a suitable deviated flexion before it is wound on the manufacturing form. Thus, the wires which are juxtaposed in the same layer and superposed from one layer to the next are duly aligned with each other. As a result, therefore, the wires which have been treated in this way are free of residual elastic stresses and no longer have a tendency to unwind by themselves.

However, it is still necessary to assure the coherence of such a bead ring during the course of the handling of it, from the time when it is removed from the manufacturing form until the time that it is incorporated in the bead of the tire by the manufacturer of the latter, without loss of its flexibility or its resistance to rupture.

For this reason, in accordance with the present invention, in order to produce a package bead ring for tires having a rectangular radial cross-section and therefore a rectilinear radially inner face and formed of at least two layers of at least two adjacent wires, preferably metallic wires, of rectangular cross-section wound alongside each other from layer to layer and from wire to wire on a manufacturing form after permanent bending of the wires, there is used a process which is characterized by the fact that during the winding of the layers of wires a piece of ribbon, which is formed of a thin flexible support resistant to shear in the radial direction between two adjacent wires and which is of a thickness at most equal to 0.5 mm and preferably less than 0.3 mm, is interposed at irregular or regular intervals at least twice per revolution between two consecutive layers of wires, the support bearing on each of its faces a layer of a material which is adherent both to the support and to the wires.

Within the scope of the present invention, the support is formed of a film of paper or of either synthetic or metallic material, of a fabric (weft and warp) or of fibers or filaments oriented perpendicular to the direction of winding of the layers of wires on the manufacturing form for the bead ring, provided that the thickness of this support is at most equal to 0.5 mm and preferably less than 0.3 mm.

It is known to interpose a continuous layer of rubber solution between the turns of a bead ring formed by winding a wide steel ribbon (French Patent No. 1,281,439). The purpose of such a gluing is to avoid the sliding of the turns on each other, in particular upon the shaping of the tire into toroidal shape. However, the continuity of the layer of glue weakens the rupture load of such a bead ring, as has been shown by the research work of the applicant.

The present invention, by contrast, preserves not only the flexibility of the bead ring, as opposed to continuous gluing, but also the rupture load of the bead ring, which is the object of the improvement claimed, due to the slight thickness of the ribbons and their ratio to the surface of a layer of wires. Within the scope of the present invention, the total active surface of the pieces of ribbons interposed between two consecutive layers of wires is between 0.5% and less than 20% of the surface of one layer of wires counted over one revolution (length of one turn times width of one layer). Upon the winding of the layers of wires on the manufacturing form and the emplacing of the pieces of ribbon, it is preferable to provide for a staggering of the pieces of ribbon in the direction of the winding from one layer of wires to the next. In this way one avoids local excess thicknesses which are prejudicial to the rupture load of the bead ring and to the geometrical uniformity of its cross-section.

The thinness of the support of the pieces of ribbon in accordance with the invention, on the one hand, avoids the infiltration of the rubber between the wires and the layers of wires of the bead ring upon the vulcanizing of the tire and, on the other hand, assures that there is intimate contact between consecutive layers of wires over practically the entire surface of the wires. One thus assures the geometry of the bead ring without detriment to its rupture load.

One embodiment of the process of the invention is shown in the drawing, in which:

FIG. 1 is a radial cross-section through a bead ring made in accordance with the process of the above mentioned French Patent No. 2,456,610 (U.S. Pat. No. 4,305,769) out of steel wire of rectangular cross-section which has previously been bent by deviated flexion in order to be wound without elastic residual stress on a conical manufacturing form;

FIG. 2 shows schematically the position of the interposed ribbons in accordance with the invention in a bead ring during the course of manufacture, the conical manufacturing form on which the successive layers of wires are wound not being show; and FIG. 3 shows a cross-section through a ribbon used in accordance with the invention.

The radial cross-section of FIG. 1 is that of a bead ring of rectangular cross-section 1 whose radially inner face 11 is frustoconical, of an angle $\alpha$, the axis of the cone not being shown. As can be seen, the bead ring is formed of previously cleaned wires 2 of steel containing 0.6% carbon, of rectangular cross-section. Each of the five adjoining layers 21 of wires 2 constituting the bead ring comprises five wires 2 which are juxtaposed alongside of each other on the small sides 22 of the rectangular cross-sections. Thus, the large sides 23 of the cross-sections corresponding to a layer are aligned in the extension of each other and the radially inner face 11 of the radial cross-section 1 of the bead ring is rectilinear, as are the contact interfaces 24 from one layer 21 to the next.

The bead ring 3, which is being wound in FIG. 2, has been formed of several layers 31 of three wires 2 for simplicity of the drawing. The fourth layer 314 is being wound. In accordance with the present invention, ribbons 4 having two adhesive faces are arranged at regular angular distances apart around the winding axis (of rotation) E of the bead ring 3 on the third layer 313.

In the cross-section 40 of a ribbon 4 shown in FIG. 3 there can be noted the support 41 and on each of the faces 411, 412 of the support a layer 51, 52 of a material (glue or adhesive) capable of adhering both to the support 41 and to the wires 2 forming the bead ring 3 which has been treated by the process in accordance with the present invention.

For the bead ring of FIG. 1 there were used pieces of ribbon having a support of a thickness of 0.06 mm with a layer of self-adhesive glue of a thickness of 0.02 mm on each of its faces.

What is claimed is:

1. A process for manufacturing a package bead ring for tires having a rectilinear frustoconical radically inner face and formed of at least two layers of at least two adjacent wires, preferably metallic wires, of rectangular cross-section wound alongside each other from layer to layer and from wire to wire on a conical manufacturing form after permanent bending of the wires by deviated flexion characterized by the fact that during the winding of the layers of wires a piece of ribbon, which is formed of a thin flexible support resistant to shear in the radial direction between two adjacent wires and which is of a thickness at most equal to 0.5 mm and preferably less than 0.3 mm, is interposed at irregular or regular intervals at least twice per revolution between two consecutive layers of wires, the support bearing on each of its faces a layer of a material which is adherent both to the support and to the wires.

2. A process according to claim 1, characterized by the fact that the total active surface of the pieces of ribbon interposed between two consecutive layers of wires is between 0.5% and less than 20% of the surface of one layer of wires counted over one revolution.

3. A process according to claim 1 or 2, characterized by the fact that the support is formed of a film of paper or of either synthetic or metallic material, of a fabric or of fibers or filaments oriented perpendicular to the direction of winding of the layers of wires on the manufacturing form for the bead ring.

4. A package ring for tires manufactured by the process of claim 1.

* * * * *

UNITED STATES PATENT AND TRADEMARK OFFICE
CERTIFICATE OF CORRECTION

PATENT NO. : 4,477,301
DATED : October 16, 1984
INVENTOR(S) : Maurice Bouju et al It is certified that error appears in the above—identified patent and that said Letters Patent is hereby corrected as shown below:

On the title page;
At the end of Item 56, insert

--              FOREIGN PATENT DOCUMENT 1,251,403     12/1960     France --.

Col. 3, line 10, "radically" should read -- radially --.

Signed and Sealed this

Second Day of July 1985

[SEAL]

Attest:

DONALD J. QUIGG

*Attesting Officer*      *Acting Commissioner of Patents and Trademarks*